US012079497B2

(12) United States Patent
Kobayashi et al.

(10) Patent No.: US 12,079,497 B2
(45) Date of Patent: Sep. 3, 2024

(54) SYSTEM CONFIGURATION MANAGEMENT DEVICE, SYSTEM CONFIGURATION MANAGEMENT METHOD, AND SYSTEM CONFIGURATION MANAGEMENT PROGRAM

(71) Applicant: Hitachi, Ltd., Tokyo (JP)

(72) Inventors: Miho Kobayashi, Tokyo (JP); Akira Deguchi, Tokyo (JP); Kazuki Togo, Tokyo (JP); Tsukasa Shibayama, Tokyo (JP); Takanobu Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 108 days.

(21) Appl. No.: 17/942,464

(22) Filed: Sep. 12, 2022

(65) Prior Publication Data

US 2023/0214142 A1    Jul. 6, 2023

(30) Foreign Application Priority Data

Jan. 5, 2022    (JP) .................................. 2022-000765

(51) Int. Cl.
*G06F 3/06*            (2006.01)
(52) U.S. Cl.
CPC ............ *G06F 3/0634* (2013.01); *G06F 3/061* (2013.01); *G06F 3/0631* (2013.01); *G06F 3/0665* (2013.01); *G06F 3/067* (2013.01)

(58) Field of Classification Search
None
See application file for complete search history.

(56) References Cited

U.S. PATENT DOCUMENTS

| 10,185,624 B2 | 1/2019 | Akutsu et al. |
| 2010/0153482 A1 | 6/2010 | Kim et al. |
| 2016/0127204 A1* | 5/2016 | Ozaki .................... G06F 9/505 709/224 |

* cited by examiner

*Primary Examiner* — Brian R Peugh
(74) *Attorney, Agent, or Firm* — MATTINGLY & MALUR, PC

(57) ABSTRACT

To quickly and appropriately adjust a performance of a storage system. A storage configuration optimization device for managing a storage system including one or more storages implemented by a plurality of SDS nodes includes a virtual CPU. The virtual CPU is configured to receive a request for an execution period and a necessary performance of a project using the storage system, and select, based on consumption information and performance information of a resource of the storage system, one or more change patterns satisfying the request for the execution period and the necessary performance from among a plurality of change patterns indicating configuration changes of the storage system.

10 Claims, 15 Drawing Sheets

FIG. 6

CONFIGURATION OPERATION SCHEDULE 311

| PROJECT | START date/time | OPTIMIZATION PATTERN | TARGET SDS | | TARGET SDS Node | | TARGET VOL | | SIZE | NUMBER | UPDATE INSTANCE TYPE |
|---|---|---|---|---|---|---|---|---|---|---|---|
| | | | No. | NEW | No. | NEW | No. | NEW | | | |
| A | 02.13.2021, 11:00pm | 1-1 | 3 | x | - | - | - | - | 50GB | 1 | - |
| B | 02.15.2021, 12:00pm | 2-2 | - | - | 1 | - | - | - | 100GB | 1 | - |
| A | 02.20.2021, 11:00pm | 1-2 | 3 | - | - | - | - | - | 50GB | 1 | - |
| ... | | | | | | | | | | | |

FIG. 7

PROJECT MONITORING INFORMATION 315

| PROJECT | USAGE Compute VM No. | EXECUTION PERIOD | | EXECUTION CONTENT | ENHANCEMENT or REDUCTION RATE |
|---|---|---|---|---|---|
| | | START date/time | END date/time | | |
| A | 1 | 02.13.2021, 11:00pm | 02.20.2021, 11:00pm | STORAGE ENHANCEMENT | 25% |
| B | 2 | 02.15.2021, 15:00pm | - | STORAGE REDUCTION | 10% |
| ... | | | | | |

FIG. 9

REQUEST FORM 900

PROJECT NAME: | A | 901

START date/time: | 0213/2020 | 11:00 PM | 902

END date/time: | 0220/2020 | 11:00 PM | 903

PURPOSE: ● STORAGE ENHANCEMENT  ○ STORAGE REDUCTION  904

ENHANCEMENT or REDUCTION RATE: | 25 % | 905

Submit 906

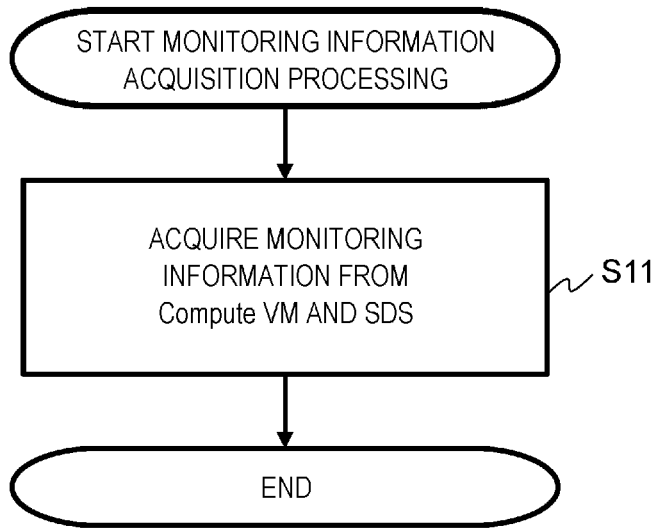
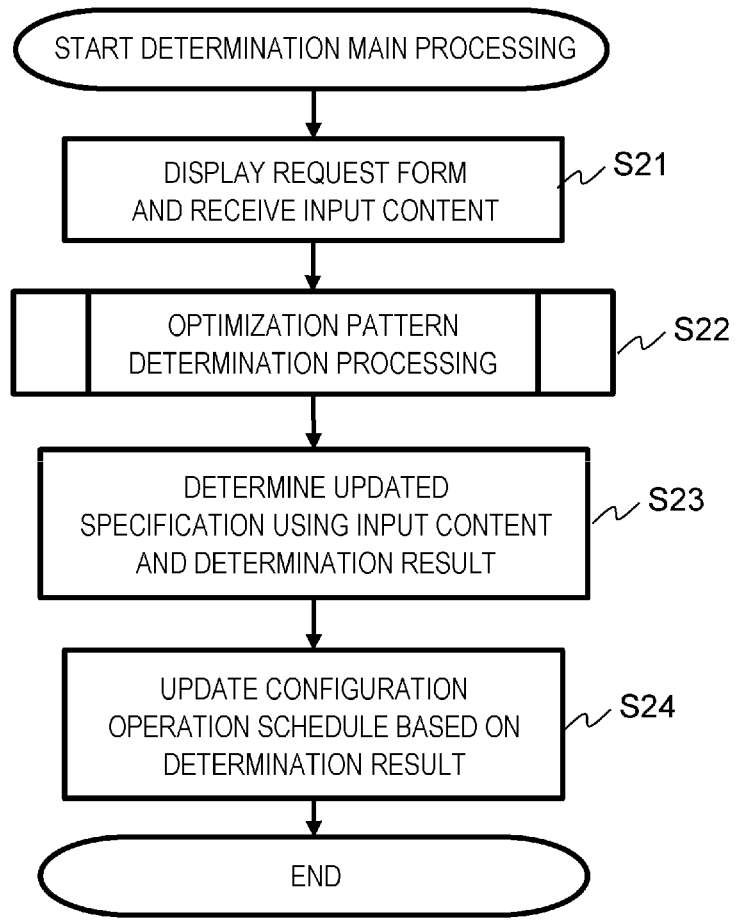

SYSTEM CONFIGURATION MANAGEMENT DEVICE, SYSTEM CONFIGURATION MANAGEMENT METHOD, AND SYSTEM CONFIGURATION MANAGEMENT PROGRAM

CROSS-REFERENCE TO RELATED APPLICATION

The present application claims priority from Japanese application JP2022-000765, filed on Jan. 5, 2022, the contents of which is hereby incorporated by reference into this application.

BACKGROUND OF THE INVENTION

1. Field of the Invention

The present invention relates to a technique of managing a system configuration of a storage system including a storage node.

2. Description of the Related Art

Users who use a flexible public cloud as an IT platform are increasing. The public cloud is based on, for example, a pay-as-you-go service. There is a concern that cost may increase depending on a resource to be used, and a technology capable of effectively using the resource is required.

As a use case of using a public cloud, bursting is known in which a resource of the public cloud is temporarily purchased when the resource is temporarily required, and the resource is deleted at the end of use. According to the bursting, there is an advantage that cost can be optimized, but there is a problem that it is necessary to control the purchase of resource and the deletion of resources depending on a status, and the operation is complicated.

For example, U.S. patent Ser. No. 10/185,624 specification discloses a technique of adding nodes in a distributed storage system.

For example, in the distributed storage system, when nodes are added or removed, data relocation occurs among volumes. Therefore, for example, it is necessary to perform data relocation in a background at a level that does not affect a normal business using a storage system. Therefore, there is a problem that it takes a long time until the data relocation is completed.

In addition, in a use case in which bursting is performed in a public cloud, it is difficult to control a processing time on a vendor side of a storage system due to an influence of a virtual network of the public cloud. There is a possibility that a time until data relocation is further lengthened, and there is a possibility that a long time is required in resource deletion processing at the end of use, which may reduce a cost reduction effect of bursting.

SUMMARY OF THE INVENTION

The invention has been made in view of the above circumstances, and an object of the invention is to provide a technique capable of quickly and appropriately adjusting a performance of a storage system.

In order to achieve the above object, a system configuration management device according to one aspect is a system configuration management device for managing a system including one or more storages implemented by a plurality of storage nodes. The system configuration management device includes a processor. The processor is configured to receive a request for an execution period and a necessary performance of a project using the system, and select, based on consumption information and performance information of a resource of the storage, one or more change patterns satisfying the request for the execution period and the necessary performance from among a plurality of change patterns indicating configuration changes of the system.

According to the invention, it is possible to quickly and appropriately adjust a performance of a storage system.

BRIEF DESCRIPTION OF THE DRAWINGS

FIG. 6 is a configuration diagram of a configuration operation schedule according to the embodiment.
FIG. 7 is a configuration diagram of project monitoring information according to the embodiment.
FIG. 9 is a configuration diagram of a request form according to the embodiment.
FIG. 10 is a flowchart of monitoring information acquisition processing according to the embodiment.
FIG. 11 is a flowchart of determination main processing according to the embodiment.

DESCRIPTION OF THE PREFERRED EMBODIMENTS

An embodiment will be described with reference to drawings. The embodiment described below does not limit the invention according to the claims, and all elements and combinations thereof described in the embodiment are not necessarily essential to the solution of the invention.

In the following description, information has a data structure in a table format, but the data structure of the information is not limited thereto.

In addition, in the following description, processing may be described using a program as a subject of an operation. The program may be executed by a processor (for example, a CPU) to perform predetermined processing while appropriately using a storage resource (for example, a memory) and/or a communication interface device (for example, a network interface card (NIC)), and thus the subject of the processing may be the processor. The processing described with the program as the subject of the operation may be processing performed by a processor or a computer (system) including the processor.

In addition, in the following description, two or more programs may be implemented as one program, or one program may be implemented as two or more programs.

In addition, in the following description, an "instance" indicates a virtual computer implemented by software using resources on one or more physical computers, and may be implemented on a public cloud or a private cloud.

In addition, in the following description, an "instance type" is determined by a combination of specification values of resources such as a CPU frequency, the number of cores, a memory speed, a memory capacity, and a network interface (I/F) band, and indicates a type of a configuration of the instance. The specification value may be a CPU frequency, the number of cores, a memory speed, a memory capacity, a network I/F band, or any other value.

First, an outline of an embodiment will be described.

Figure 1:
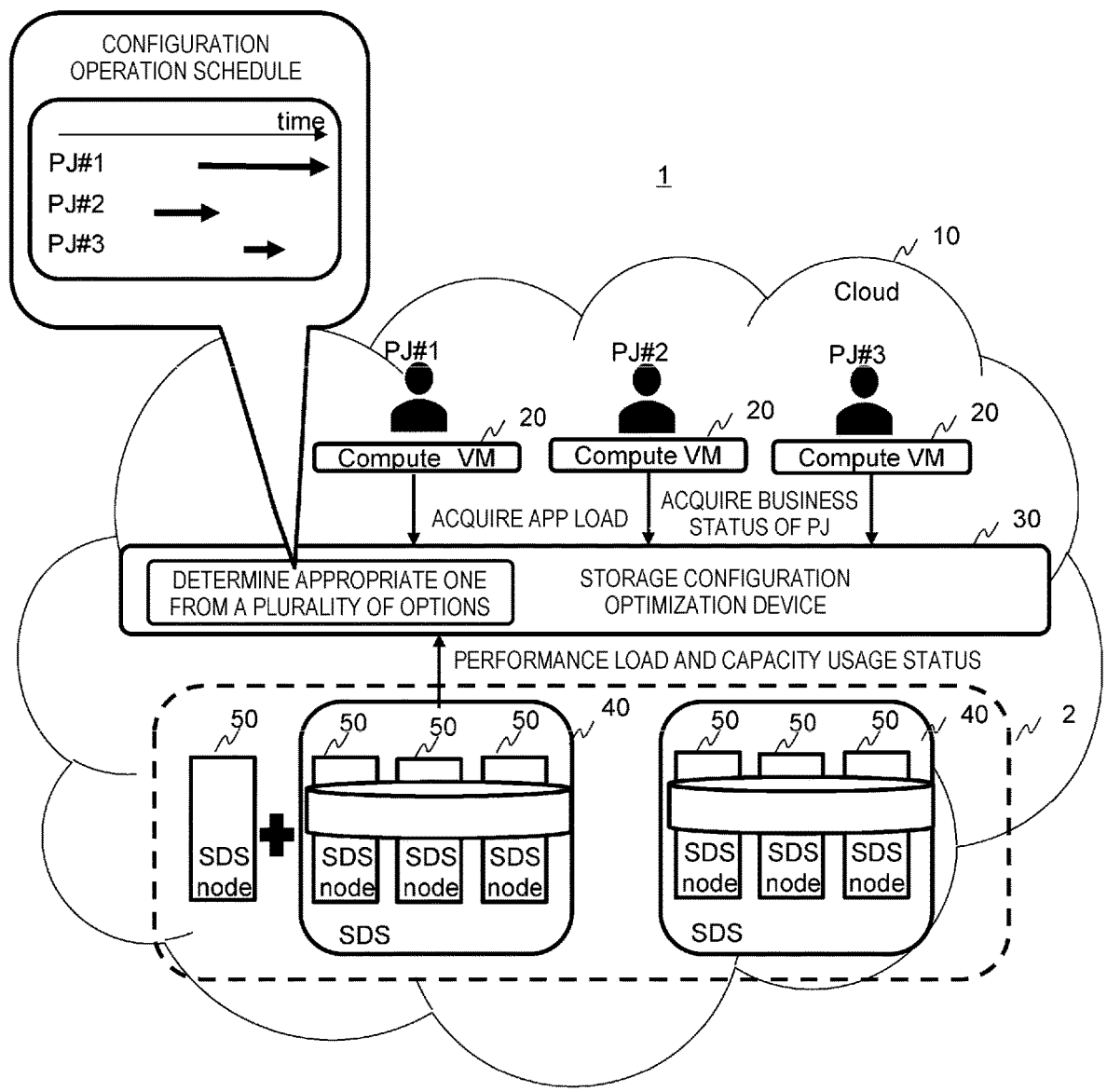
FIG. 1 is a diagram illustrating an outline of an embodiment.

FIG. 1 is a diagram illustrating an outline of an embodiment.

A computer system 1 according to the embodiment includes one or more compute virtual machines (VM) 20, a storage configuration optimization device 30, and a storage system 2. The storage system 2 includes one or more software defined storages (SDS) 40. The compute VM 20, the storage configuration optimization device 30, and the SDS 40 are implemented by, for example, a computer of a cloud 10. The cloud 10 may be a public cloud, or at least a part of the cloud 10 may be a private cloud.

The storage configuration optimization device 30 receives information on a business status (business status information) of a project executed by the compute VM 20 from a user, and acquires information on a load of an application or the like (application load information) in the compute VM 20. In addition, the storage configuration optimization device 30 acquires, from the SDS 40, information on a performance load (performance load information) and information on a usage status of a capacity (capacity usage status information) in the SDS 40.

The storage configuration optimization device 30 determines an appropriate configuration change pattern from a plurality of patterns of configuration changes (configuration change patterns) for the storage based on the business status information, the application load information, the performance load information, the capacity usage status information, or the like, and determines a schedule for executing the configuration change pattern (configuration operation schedule). Thereafter, according to the configuration operation schedule, the storage configuration optimization device 30 executes change processing of the storage according to the configuration change pattern.

Next, the computer system 1 according to the embodiment will be described in detail.

Figure 2:
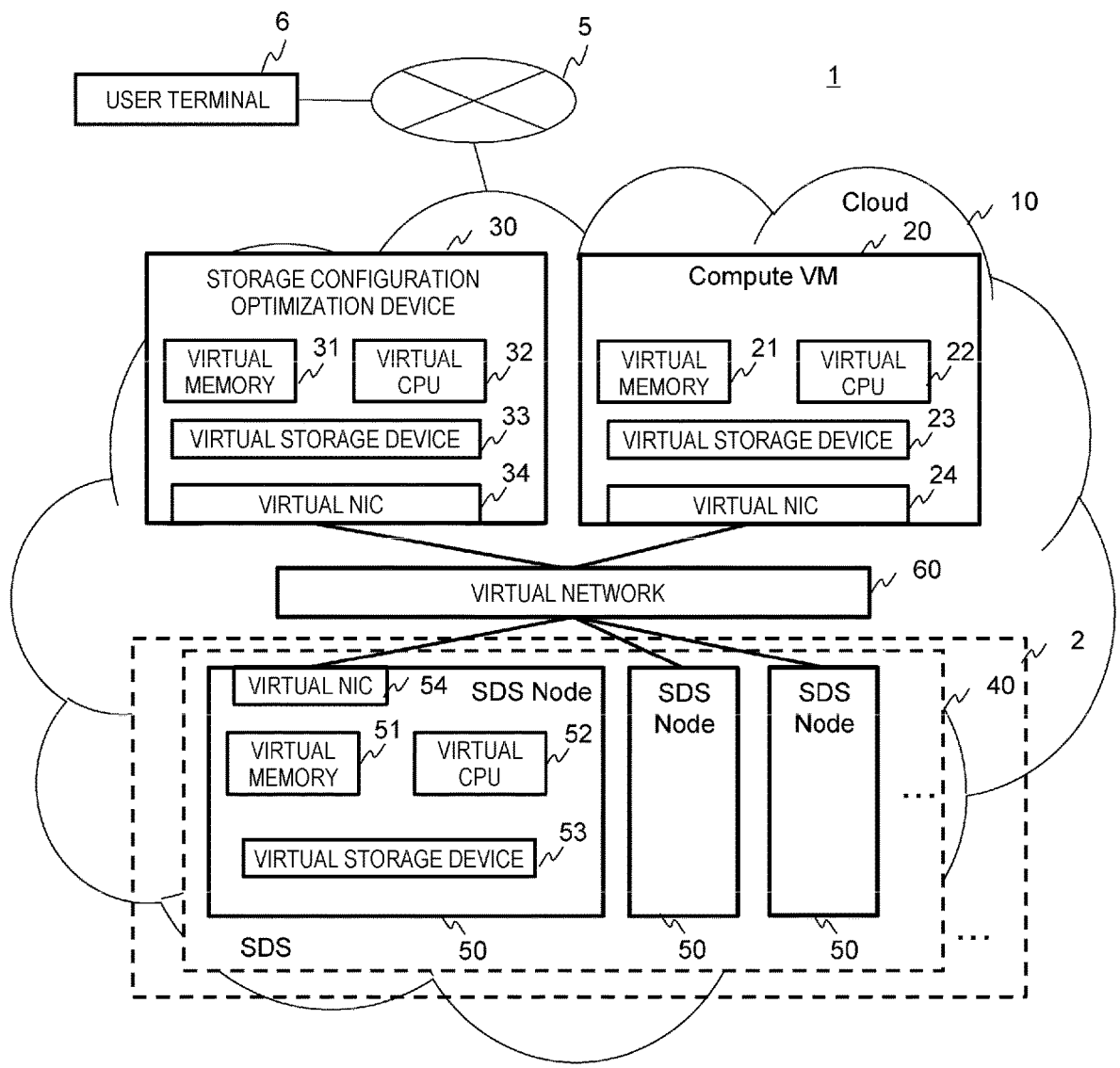
FIG. 2 is a configuration diagram of a computer system according to the embodiment.

FIG. 2 is a configuration diagram of the computer system according to the embodiment.

The computer system 1 includes the cloud 10 and a user terminal 6 used by a user. The user terminal 6 is connected to the cloud 10 via a network 5. The network 5 may be, for example, a local area network (LAN), a wide area network (WAN), or the like.

Figure 8:
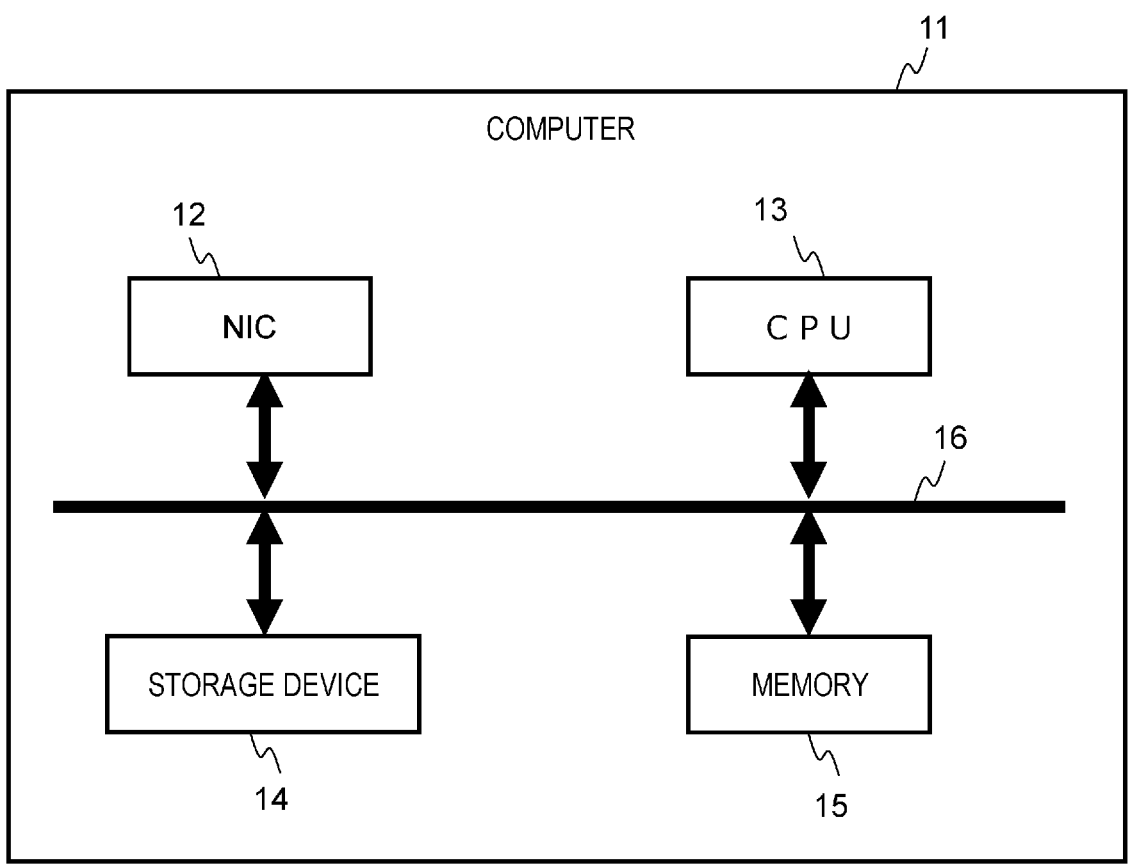
FIG. 8 is a hardware configuration diagram of a cloud computer according to the embodiment.

The cloud 10 includes one or more computers 11 (see FIG. 8). The cloud 10 includes the one or more compute VMs 20, the storage configuration optimization device 30 as an example of a storage configuration management device, the storage system 2 including the one or more SDSs 40, and a virtual network 60. The compute VM 20, the storage configuration optimization device 30, and the SDS 40 can communicate with each other via the virtual network 60. In the present embodiment, an example in which the compute VM 20, the storage configuration optimization device 30, and the SDS 40 are implemented by VMs is described, and these may be implemented by containers.

The compute VM 20 is a virtual computer (VM) implemented by hardware of the one or more computers 11. The compute VM 20 executes, for example, a program for executing a project. The compute VM 20 is implemented by the virtual computer (VM) implemented by hardware of the one or more computers 11, and includes a virtual memory 21, a virtual central processing unit (CPU) 22, a virtual storage device 23, and a virtual network interface card (NIC) 24.

The virtual NIC 24 is an I/F (interface) for communicating with other devices (the user terminal 6, the storage configuration optimization device 30, the SDS 40, or the like) via the network 5 and the virtual network 60. The virtual memory 21 is a memory (virtual memory) to which a physical memory of the computer 11 of the cloud 10 is virtually allocated. The virtual memory 21 stores a program to be executed by the virtual CPU 22 and information referred to or updated by the virtual CPU 22. The virtual CPU 22 is an example of a processor, and is a CPU (virtual CPU) to which the CPU of the computer 11 of the cloud 10 is virtually allocated. The virtual CPU 22 performs processing of the project or the like based on the program and the information stored in the virtual memory 21. The virtual storage device 23 is a physical storage device of the computer 11 of the cloud 10, for example, a virtual storage device implemented by a hard disk drive (HDD) or a solid state drive (SSD). The virtual storage device 23 stores various types of data.

The SDS 40 stores and manages user data to be used for processing in the compute VM 20. The SDS 40 includes a plurality of SDS nodes (storage nodes) 50. The SDS node 50 is implemented by a VM including hardware of the one or more computers 11, and includes a virtual memory 51, a virtual CPU 52, a virtual storage device 53, and a virtual NIC 54.

The virtual NIC 54 is an I/F for communicating with other devices (the user terminal 6, the compute VM 20, the storage configuration optimization device 30, or the like) via the network 5 and the virtual network 60. The virtual memory 51 is a memory (virtual memory) to which a physical memory of the computer 11 of the cloud 10 is virtually allocated. The virtual memory 51 stores a program to be executed by the virtual CPU 52 and information referred to or updated by the virtual CPU 52. The virtual CPU 52 is an example of a processor, and is a CPU (virtual CPU) to which the CPU of the computer 11 of the cloud 10 is virtually allocated. The virtual CPU 52 performs processing of access control or the like on user data from the compute VM 20 based on the program and the information stored in the virtual memory 51. The virtual storage device 53 is a physical storage device of the computer 11 of the cloud 10, for example, a virtual storage device implemented by a hard disk drive (HDD) or a solid state drive (SSD). The virtual storage device 53 stores the user data or the like to be used by the compute VM 20.

The storage configuration optimization device 30 determines an appropriate configuration of the one or more SDSs 40 and executes processing of changing the configuration to an appropriate configuration. The storage configuration optimization device 30 is implemented by a VM including hardware of the one or more computers 11, and includes the virtual memory 31, the virtual CPU 32, a virtual storage device 33, and a virtual NIC 34.

The virtual NIC 34 is an I/F for communicating with other devices (the user terminal 6, the compute VM 20, the SDS 40, or the like) via the network 5 and the virtual network 60. The virtual memory 31 is a memory (virtual memory) to which a physical memory of the computer 11 of the cloud 10 is virtually allocated. The virtual memory 31 stores a program to be executed by the virtual CPU 32 and information referred to or updated by the virtual CPU 32. The virtual CPU 32 is an example of a processor, and is a CPU (virtual CPU) to which the CPU of the computer 11 of the cloud 10 is virtually allocated. The virtual CPU 32 performs various types of processing based on the program and the information stored in the virtual memory 31. The virtual storage device 33 is a physical storage device of the computer 11 of the cloud 10, for example, a virtual storage device implemented by a hard disk drive (HDD) or a solid state drive (SSD). The virtual storage device 33 stores various types of data.

Next, a configuration of the virtual memory 21 of the compute VM 20 will be described.

Figure 3:
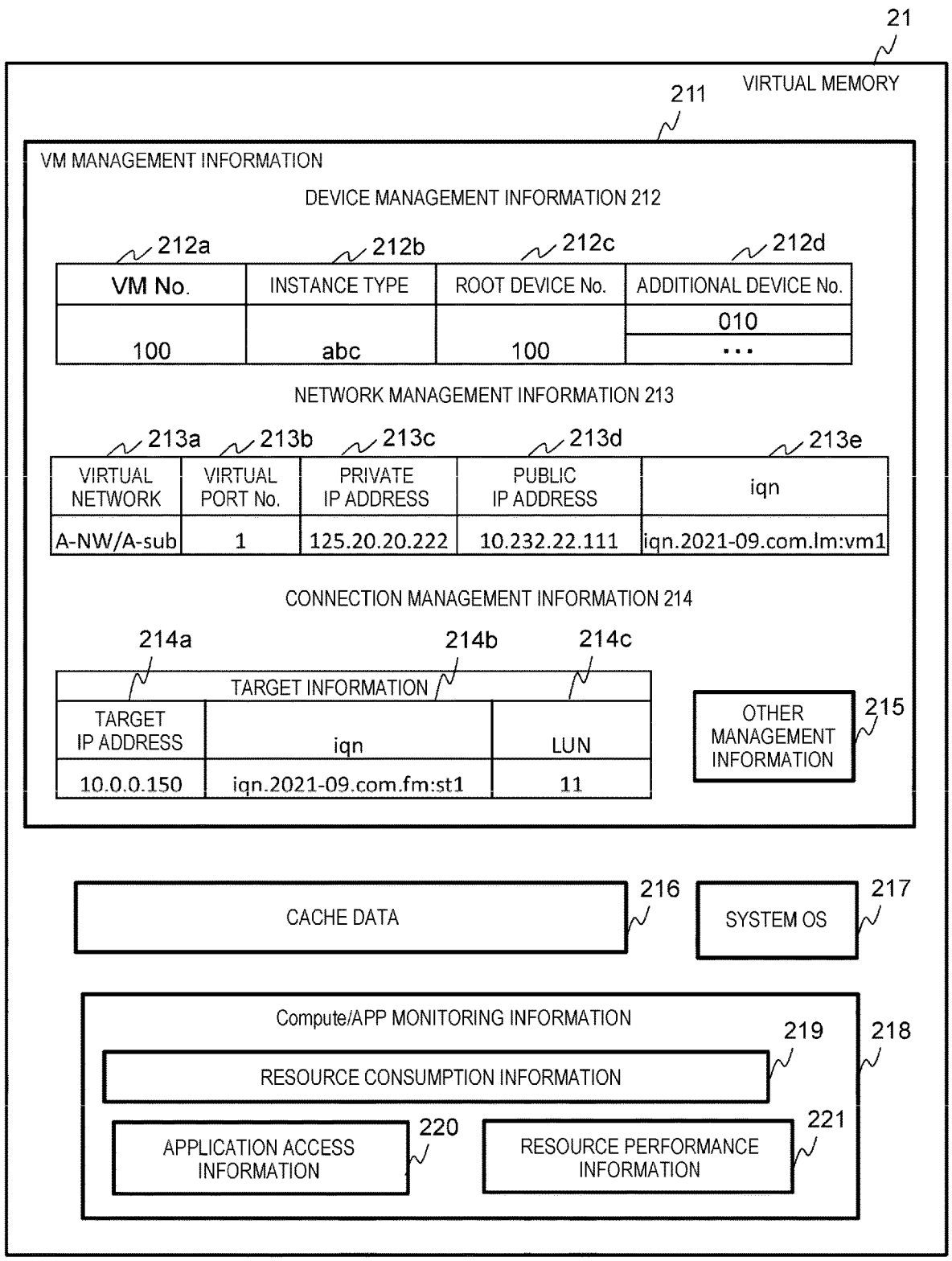
FIG. 3 is a configuration diagram of a virtual memory of a compute VM according to the embodiment.

FIG. 3 is a configuration diagram of a virtual memory of a compute VM according to the embodiment.

The virtual memory 21 stores VM management information 211, cache data 216, a system operating system (OS) 217, and compute/application (APP) monitoring information 218. When a data amount of the compute/APP monitoring information 218 is large, at least a part of the compute/APP monitoring information 218 may be stored in an area other than the virtual memory 21 (for example, a virtual storage device, an area in the cloud 10, an area outside the cloud 10, or the like).

The VM management information 211 is information related to the VM constituting the compute VM 20, and includes device management information 212, network management information 213, connection management information 214, and other management information 215. The device management information 212 is information for managing a device of the compute VM 20, and includes fields of a VM No. 212a, an instance type 212b, a root device No. 212c, and an additional device No. 212d. The VM No. 212a stores an identification number of the compute VM 20 (VM number). The instance type 212b stores a type of an instance of the compute VM 20. The root device No. 212c stores a number of a root device of the compute VM 20. The additional device No. 212d stores a number of an additional storage device (device number) connected to the compute VM 20.

The network management information 213 is information related to the network of the compute VM 20, and includes fields of a virtual network 213a, a virtual port No. 213b, a private IP address 213c, a public IP address 213d, and an iqn 213e. The virtual network 213a stores information on a virtual network to which the compute VM 20 is connected. The virtual port No. 213b stores a number of a virtual port of the compute VM 20. The private IP address 213c stores an IP address (private IP address) of the compute VM 20 in the virtual network 60. The public IP address 213d stores an IP address (public IP address) of the compute VM 20 in the network 5. The iqn 213e stores an iSCSI qualified name (iqn) of the compute VM 20.

The connection management information 214 is information related to a logical unit (LU) of the SDS 40 connected to the compute VM 20, and includes fields of a target IP address 214a, an iqn 214b, and an LUN 214c. The target IP address 214a stores an IP address of the target SDS node 50. The iqn 214b stores an iqn of the target SDS node 50. The LUN 214c stores a number of a connected LU (LUN).

Other necessary management information, which is not stored in the device management information 212, the network management information 213, and the connection management information 214, is stored in the other management information 215.

The cache data 216 is user data read from the SDS 40 or user data stored in the SDS 40. The system OS 217 is an OS that operates the compute VM 20.

The compute/APP monitoring information 218 includes resource consumption information 219, application access information 220, and resource performance information 221. The resource consumption information 219 includes a memory usage amount, a CPU usage rate, and a data storage amount in the compute VM 20. The application access information 220 includes information on the SDS 40 of an access destination to be accessed by an application. The resource performance information 221 includes a volume accessed by an application of the compute VM 20, the number of accesses to the volume (IOPS or the like), and a response time. The compute/APP monitoring information 218 may be received from a device (not illustrated) of a vendor of the cloud 10, or the VM itself may collect information.

Next, a configuration of the virtual memory 51 of the SDS node 50 will be described.

Figure 4:
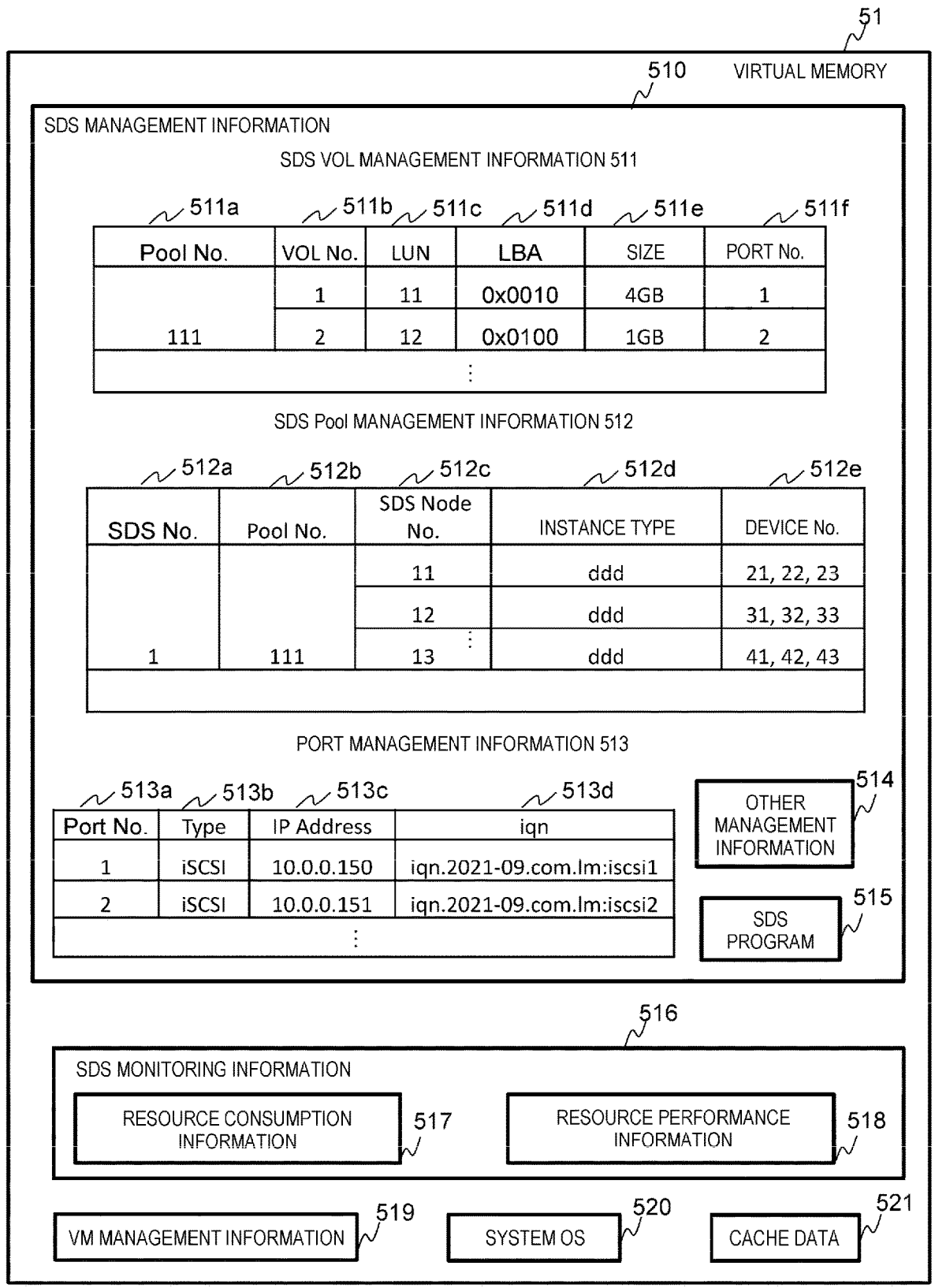
FIG. 4 is a configuration diagram of a virtual memory of an SDS node according to the embodiment.

FIG. 4 is a configuration diagram of a virtual memory of an SDS node according to the embodiment.

The virtual memory 51 stores SDS management information 510, SDS monitoring information 516, VM management information 519, a system OS 520, and cache data 521. When data amount of the SDS monitoring information 516 is large, at least a part of the SDS monitoring information 516 may be stored in an area other than the virtual memory 51 (for example, a virtual storage device, an area in the cloud 10, an area outside the cloud 10, or the like). The SDS management information 510 and the SDS monitoring information 516 may be stored only in an SDS node 50 operating as a representative among a plurality of SDS nodes 50 constituting the SDS 40, or may be stored in each SDS node 50. When each SDS node 50 stores the SDS management information 510 and the SDS monitoring information 516, only the information related to the SDS node 50 may be stored.

The SDS management information 510 includes SDS VOL management information 511, SDS Pool management information 512, port management information 513, other management information 514, and an SDS program 515.

The SDS VOL management information 511 is information to be managed in a volume (VOL) in the SDS 40, and stores an entry for each volume. The entry of the SDS VOL management information 511 includes items of a Pool No. 511a, a VOL No. 511b, an LUN 511c, an LBA 511d, a size 511e, and a port No. 511f.

The Pool No. 511a stores a number of a pool in which the volume corresponding to the entry is stored. The VOL No. 511b stores a number of the volume corresponding to the entry. The LUN 511c stores a number of an LU (LUN) including the volume corresponding to the entry. The LBA 511d stores a logic block address (LBA) in the LU of the volume corresponding to the entry. The size 511e stores a data size of the volume corresponding to the entry. The port No. 511f stores a number of a port for accessing the volume corresponding to the entry.

The SDS Pool management information 512 is information for managing a Pool in the SDS 40, and includes an entry corresponding to the Pool. The Pool is a collection of storage areas of the virtual storage devices 53 of the plurality of SDS nodes 50 constituting the SDS 40. The entry of the SDS Pool management information 512 includes fields of an SDS No. 512a, a Pool No. 512b, an SDS Node No. 512c, an instance type 512d, and a device No. 512e.

The SDS No. 512a stores a number of the SDS 40 to which the Pool corresponding to the entry belongs. The Pool No. 512b stores a number of the Pool (Pool number) corresponding to the entry. The SDS Node No. 512c stores a number of each SDS node 50 constituting the Pool corresponding to the entry. The instance type 512d stores an instance type of a VM constituting each SDS node 50 constituting the Pool corresponding to the entry. The device No. 512e stores a number of a virtual storage device constituting the Pool corresponding to the entry.

The port management information 513 is information related to the port of the SDS node 50, and stores an entry for each port. The entry of the port management information 513 includes fields of a Port No. 513a, a Type 513b, an IP Address 513c, and an iqn 513d.

The Port No. 513a stores a number of the port corresponding to the entry. The Type 513b stores a type of the port corresponding to the entry. The IP address 513c stores an IP address of the port corresponding to the entry. The iqn 513d stores an iqn of the port corresponding to the entry.

The other management information 514 stores other necessary management information which is not stored in the SDS VOL management information 511, the SDS Pool management information 512, and the port management information 513.

The SDS program 515 is a program for causing a VM to operate as the SDS node 50.

The SDS monitoring information 516 includes resource consumption information 517 and resource performance information 518. The resource consumption information 517 includes a memory usage amount, a CPU usage rate, a data storage amount, or the like in the SDS node 50. The resource performance information 518 includes a throughput and a response time in the SDS node 50.

The VM management information 519 is information related to a VM constituting the SDS node 50. The VM management information 519 includes information similar to the VM management information 211 for the VM constituting the SDS node 50. The system OS 520 is an OS that operates the SDS node 50. The cache data 521 is user data read from the virtual storage device 53 or user data stored in the virtual storage device 53.

Next, the configuration of the virtual memory 31 of the storage configuration optimization device 30 will be described.

Figure 5:
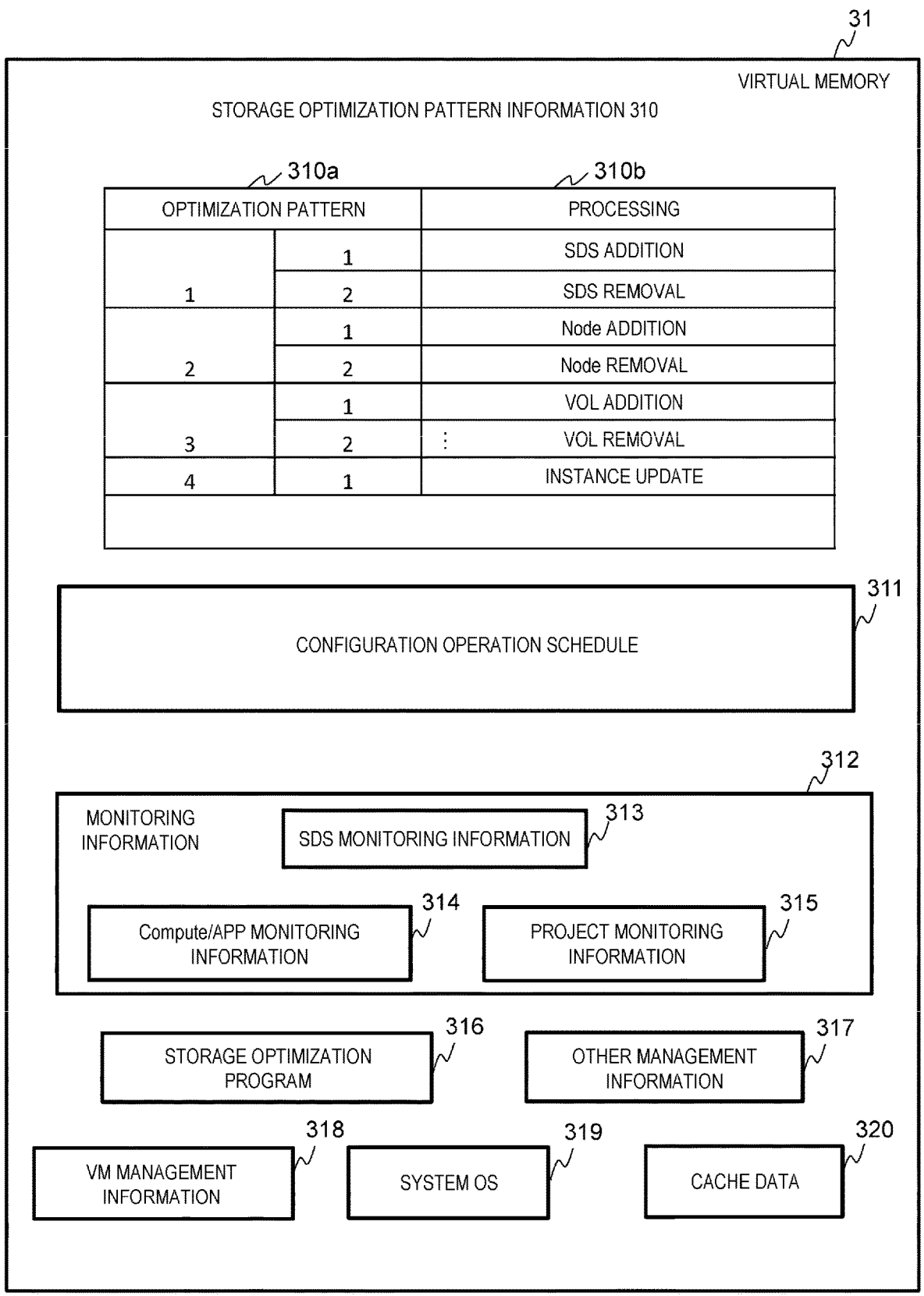
FIG. 5 is a configuration diagram of a virtual memory of a storage configuration optimization device according to the embodiment.

FIG. 5 is a configuration diagram of a virtual memory of a storage configuration optimization device according to the embodiment.

The virtual memory 31 stores storage optimization pattern information 310, a configuration operation schedule 311, monitoring information 312, a storage optimization program 316, other management information 317, VM management information 318, a system OS 319, and cache data 320. When data amount of the monitoring information 312 is large, at least a part of the monitoring information 312 may be stored in an area other than the virtual memory 31 (for example, a virtual storage device, an area in the cloud 10, an area outside the cloud 10, or the like).

The storage optimization pattern information 310 stores a plurality of patterns for changing the configuration of the storage system 2. The storage optimization pattern information 310 includes an entry for each pattern. The entry of the storage optimization pattern information 310 includes fields of an optimization pattern 310a and processing 310b. The optimization pattern 310a stores a number for identifying a pattern. The processing 310b stores a processing content in the pattern corresponding to the entry. According to the storage optimization program 316, one or more patterns in the storage optimization pattern information 310 are selected as appropriate patterns depending on a status.

The configuration operation schedule 311 stores an operation schedule for executing the selected patterns. Details of the configuration operation schedule 311 will be described later.

The monitoring information 312 includes SDS monitoring information 313, compute/APP monitoring information 314, and project monitoring information 315. The SDS monitoring information 313 is obtained by aggregating the SDS monitoring information 516 of each SDS node 50. The compute/APP monitoring information 314 is obtained by aggregating the compute/APP monitoring information 218 of each compute VM 20. The project monitoring information 315 stores information related to the project. Details of the project monitoring information 315 will be described later.

The storage optimization program 316 is a program for determining an appropriate configuration of the SDS and controlling a configuration change of the SDS.

The other management information 317 stores various types of necessary management information.

The VM management information 318 is information related to a VM constituting the storage configuration optimization device 30. The VM management information 318 includes information similar to the VM management information 211 for the VM constituting the storage configuration optimization device 30. The system OS 319 is an OS that operates the storage configuration optimization device 30. The cache data 320 is temporarily cached data.

Next, the configuration operation schedule 311 will be described.

FIG. 6 is a configuration diagram of a configuration operation schedule according to the embodiment.

The configuration operation schedule 311 stores an entry for each pattern in which a configuration change is executed (change pattern). The entry of the configuration operation schedule 311 includes fields of a project 311a, a start date/time 311b, an optimization pattern 311c, a target SDS 311d, a target SDS Node 311e, a target VOL 311f, a size 311g, a number 311h, and an update instance type 311i.

The project 311a stores identification information of a project to which a pattern corresponding to the entry is applied. The start date/time 311b stores a date and time (execution time) at which the configuration change to the pattern corresponding to the entry is started. The optimization pattern 311c stores identification information indicating the pattern corresponding to the entry. The target SDS 311d stores a number of the target SDS 40 when the pattern corresponding to the entry targets an SDS, and information indicating whether the SDS is a new SDS. The target SDS Node 311e stores a number of the target SDS node 50 when the pattern corresponding to the entry targets the SDS node 50, and information indicating whether the SDS node 50 is a new SDS node. The target VOL 311f stores a number of a target volume when the pattern corresponding to the entry targets a volume, and information indicating whether the volume is a new volume. The size 311g stores a data size of a change target of the pattern corresponding to the entry. The number 311h stores the number of change targets in the pattern corresponding to the entry. The update instance type 311i stores an instance type when an instance of a VM is updated in the pattern corresponding to the entry.

Next, the project monitoring information 315 will be described.

FIG. 7 is a configuration diagram of project monitoring information according to the embodiment.

The project monitoring information 315 is information related to a project to be executed by the compute VM 20, and stores, for example, information input by a user in a request form 900 to be described later. The project monitoring information 315 stores an entry for each project. The entry of the project monitoring information 315 includes fields of a project 315a, a usage compute VM No. 315b, an execution period 315c, an execution content 315d, and an enhancement or reduction rate 315e.

The project 315a stores identification information of a project (for example, a project name) corresponding to the entry. The usage compute VM No. 315b stores a number of the compute VM 50 used for the project corresponding to the entry. The execution period 315c stores an execution period in which the project corresponding to the entry is executed. The execution period includes a start date and time and an end date and time. For a project whose end is not determined, no value is set for the end date and time. The execution content 315d stores a content (storage enhancement or storage reduction) for the storage system 2 in the project. The enhancement or reduction rate 315e stores an enhancement rate or a reduction rate for the storage system 2 in the project corresponding to the entry.

Next, the cloud computer 11 will be described.

FIG. 8 is a hardware configuration diagram of a cloud computer according to the embodiment.

The computer 11 includes a CPU 13, a memory 15, an NIC 12, a storage device 14, and an internal bus 16. The CPU 13, the memory 15, the NIC 12, and the storage device 14 are connected via the internal bus 16.

The CPU 13 executes various types of processing based on a program and information stored in the memory 15. The memory 15 stores a program to be executed by the CPU 13 and information referred to or updated by the CPU 13. The NIC 12 is an I/F for communicating with other devices (the user terminal 6, the other computers 11, or the like) via the network 5 and an internal network (not illustrated) of the cloud 10. The storage device 14 is, for example, an HDD or an SSD. The storage device 14 stores various types of information.

Next, the request form 900 will be described.

FIG. 9 is a configuration diagram of a request form according to the embodiment.

The request form 900 is a form in a graphical user interface (GUI) displayed on the user terminal 6 by the storage configuration optimization device 30 when the user requests a change in a configuration of a storage accompanying a change in a project or the like.

The request form 900 includes a project name input area 901, a start date and time input area 902, an end date and time input area 903, a purpose selection area 904, an enhancement or reduction rate input area 905, and a Submit button 906.

The project name input area 901 is an area for inputting a target project name. The start date and time input area 902 is an area for inputting a start date and time of the project. The end date and time input area 903 is an area for inputting an end date and time of the project. When the end date and time of the project is not determined, the end date and time may not be input. The purpose selection area 904 is an area for selecting a purpose of changing the storage in the project. The enhancement or reduction rate input area 905 is an area for inputting an enhancement rate or a reduction rate for a storage. The Submit button 906 is a button for transmitting the information input to the request form 900 to the storage configuration optimization device 30. When the Submit button 906 is pressed, the information input to the request form 900 is transmitted to the storage configuration optimization device 30 by the device displaying the request form 900.

Next, a processing operation in the computer system 1 according to the embodiment will be described.

First, monitoring information acquisition processing will be described.

FIG. 10 is a flowchart of the monitoring information acquisition processing according to the embodiment.

The monitoring information acquisition processing is, for example, periodically executed by the storage configuration optimization device 30. The storage optimization program 316 of the storage configuration optimization device 30 (strictly speaking, the virtual CPU 32 executing the storage optimization program 316) acquires the compute/APP monitoring information periodically transmitted from the compute VM 20, stores the compute/APP monitoring information in the compute/APP monitoring information 314 of the virtual memory 31, acquires SDS management information periodically transmitted from the SDS 40, stores the SDS management information in the SDS monitoring information 313 of the virtual memory 31 (step S11), and ends the processing. In the present embodiment, the management information periodically transmitted from the compute VM 20 and the SDS 40 is acquired, but the invention is not limited thereto, and the management information may be periodically requested and acquired from the compute VM 20 and the SDS 40 by the storage optimization program 316.

Next, determination main processing will be described.

FIG. 11 is a flowchart of the determination main processing according to the embodiment.

The determination main processing is executed, for example, when the storage configuration optimization device 30 receives a request for a change in the configuration of the storage accompanying a change in the project or the like from the user terminal 6. The storage optimization program 316 of the storage configuration optimization device 30 causes the user terminal 6 of the request source to display the request form 900, and receives the content input to the request form 900 (step S21).

Next, the storage optimization program 316 executes optimization pattern determination processing (see FIG. 13) (step S22). According to the optimization pattern determination processing, a pattern of a configuration change of the storage suitable for the input content is determined.

Next, when the SDS 40 is to be updated or when it is necessary to update a specification of the SDS node 50 of the SDS 40, the storage optimization program 316 determines a specification after update (updated specification) using the input content and a determination result of the optimization pattern determination processing (step S23).

Next, the storage optimization program 316 updates the configuration operation schedule 311 based on the determination result and a volume when the new specification is determined (step S24), and ends the processing. Specifically, for example, when the SDS 40 is updated based on the determination result, in the configuration operation schedule 311, the storage optimization program 316 adds an entry of a pattern for updating (reinforcing or reducing) the SDS, sets a start date and time of the project to the start date and time 311b, adds an entry of a pattern for returning (reducing or reinforcing) the SDS to the original state, and sets an end date and time of the project for the start date and time 311b.

Next, the configuration change management processing will be described.

Figure 12:
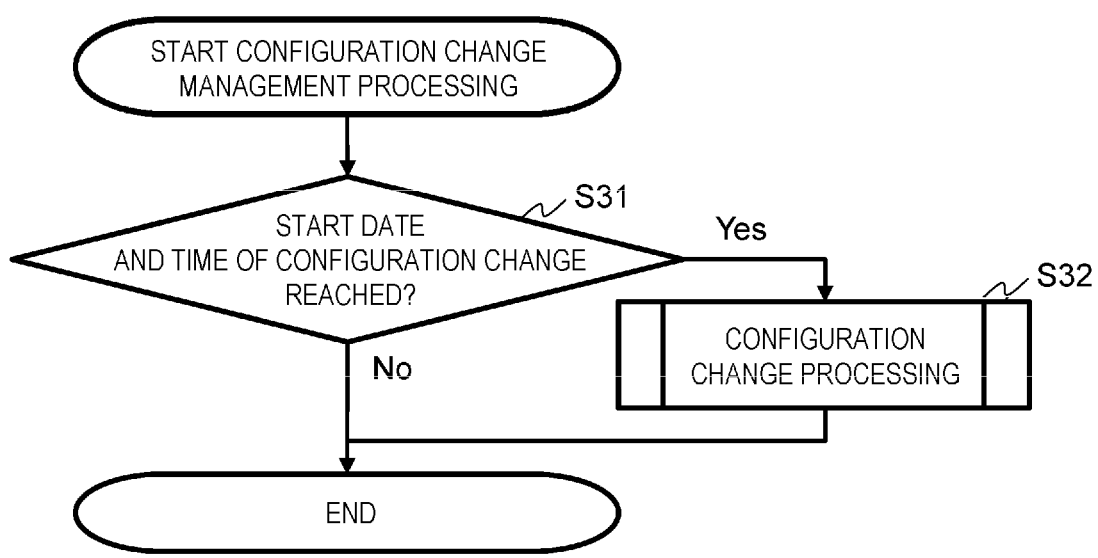
FIG. 12 is a flowchart of configuration change management processing according to the embodiment.

FIG. 12 is a flowchart of the configuration change management processing according to the embodiment.

The configuration change management processing is, for example, periodically executed by the storage configuration optimization device 30. The storage optimization program 316 of the storage configuration optimization device 30 determines whether the start date and time of the start date/time 311b of each entry of the configuration operation schedule 311 is reached (step S31).

As a result, when the start date and time is not reached (step S31: No), the storage optimization program 316 ends the processing. On the other hand, when the start date and time is reached (step S31: Yes), the storage optimization program 316 executes the configuration change processing of the pattern corresponding to the entry which is the start date and time (step S32). Here, the configuration change processing includes processing illustrated in FIGS. 14 to 20.

Next, the optimization pattern determination processing (step S22) will be described.

Figure 13:
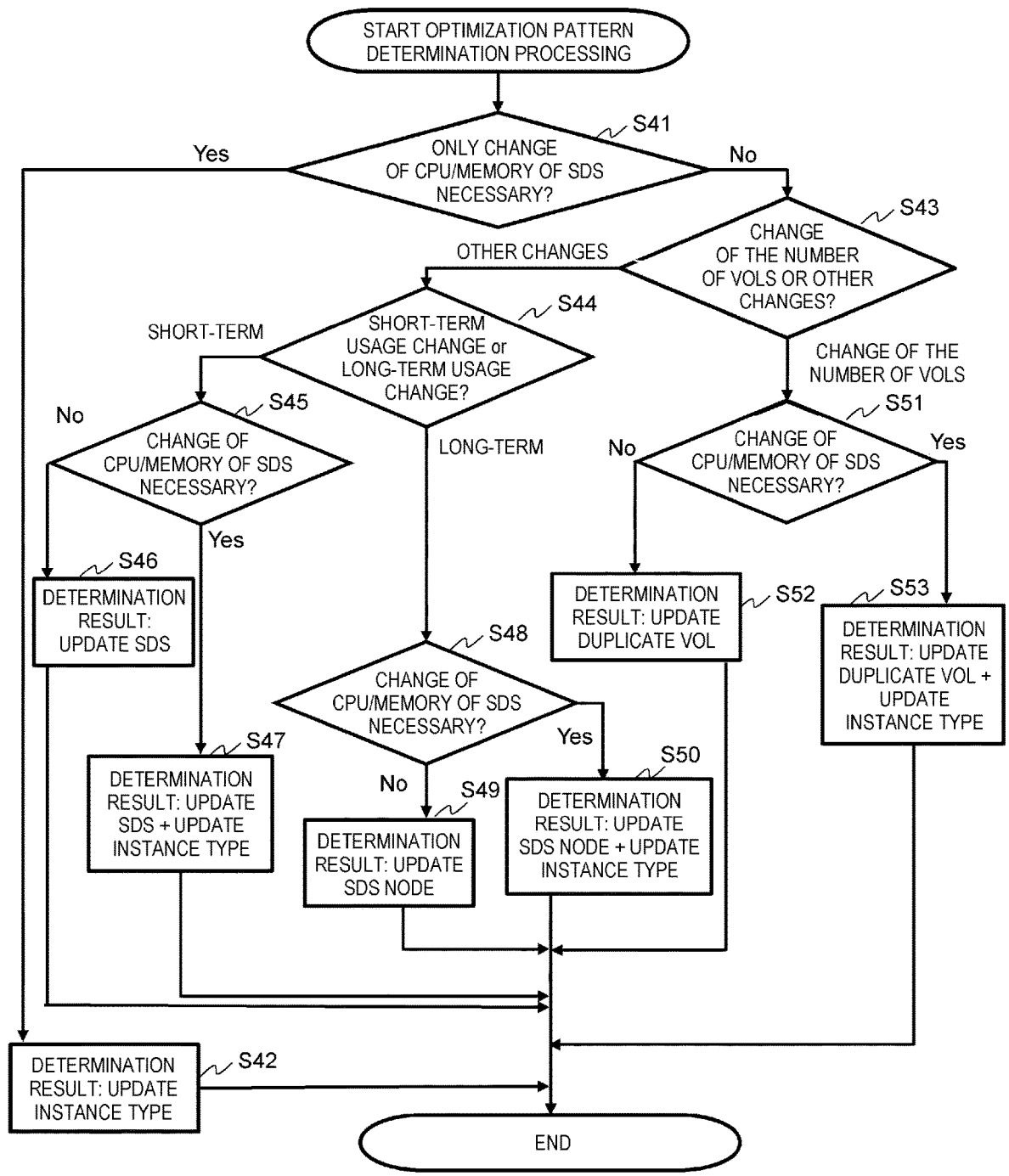
FIG. 13 is a flowchart of optimization pattern determination processing according to the embodiment.

FIG. 13 is a flowchart of the optimization pattern determination processing according to the embodiment.

The storage optimization program 316 determines, based on the compute/APP monitoring information and the SDS monitoring information, whether the configuration change of the storage system 2 satisfying the input content requires only the change of the CPU/memory of the SDS 40 (step S41). Specifically, when the memory usage amount or the CPU usage rate of the SDS 40 stored in the resource consumption information 517 is equal to or more than a predetermined upper limit threshold or when the memory usage amount or the CPU usage rate is equal to or less than a predetermined lower limit threshold, and when the data storage amount in the resource consumption information 517 is sufficient (the data storage amount is equal to or less than a predetermined threshold), the storage optimization program 316 determines that only the change of the CPU/memory of the SDS 40 is necessary.

As a result, when it is determined that only the change of the CPU/memory of the SDS 40 is necessary (step S41: Yes), the storage optimization program 316 determines the determination result as a pattern for updating the instance type of the SDS node 50 of the SDS 40 (pattern 4-1: instance change pattern) (step S42), and ends the processing.

On the other hand, when it is determined that not only the change of the CPU/memory of the SDS 40 is necessary (step S41: No), the storage optimization program 316 determines whether the change of the number of volumes or other changes is necessary (step S43). Specifically, based on the application access information 220 and the resource performance information 221 of the compute/APP monitoring information 218, the storage optimization program 316 determines that the number of volumes is increased when an access destination of the application is concentrated on the access to a specific volume and the number of accesses is equal to or more than a predetermined upper limit threshold, and determines that the number of volumes is reduced when the access destination of the application is concentrated on the access to a specific volume and the number of accesses is equal to or less than a predetermined lower limit threshold. On the other hand, when the access destination of the application is distributed to a plurality of volumes instead of concentrating the access to a specific volume, the storage optimization program 316 may determine that other changes are necessary.

As a result, when other changes are necessary (step S43: other changes), the storage optimization program 316 advances the processing to step S44, while when the change of the number of VOLs is necessary (step S43: change of the number of VOLs), the storage optimization program 316 advances the processing to step S51.

In step S44, the storage optimization program 316 determines whether the storage change is a short-term usage change or a long-term usage change. Specifically, when the execution period of the project monitoring information is equal to or shorter than a predetermined period, the storage optimization program 316 determines that the storage change is a short-term usage change, and when the execution period is equal to or longer than the predetermined period or the execution period is unknown (when the end date and time is not determined), the storage optimization program 316 determines that the storage change is a long-term usage change.

As a result, when it is determined that the storage change is a short-term usage change (step S44: short-term), the storage optimization program 316 determines whether the change of the CPU/memory of the SDS 40 is necessary (step S45). Specifically, when the memory usage amount or the CPU usage rate of the SDS 40 stored in the resource consumption information 517 is equal to or more than the predetermined upper limit threshold or when the memory usage amount or the CPU usage rate is equal to or less than the predetermined lower limit threshold, the storage optimization program 316 determines that the change of the CPU/memory of the SDS 40 is necessary.

As a result, when it is determined that the change of the CPU/memory of the SDS 40 is not necessary (step S45: No), the storage optimization program 316 determines the determination result as a pattern for updating the SDS 40, specifically, (a pattern 1-1 (storage addition pattern) and a pattern 1-2 (storage deletion pattern)) (step S46), and ends the processing.

On the other hand, when it is determined that the change of the CPU/memory of the SDS 40 is necessary (step S45: Yes), the storage optimization program 316 determines the determination result as the pattern for updating the SDS 40 (patterns 1-1 and 1-2) and the pattern for updating the instance type of each node of the SDS 40 (pattern 4-1: instance change pattern) (step S47), and ends the processing.

On the other hand, when it is determined in step S44 that the storage change is a long-term usage change (step S44: long-term), the storage optimization program 316 determines whether the change of the CPU/memory of the SDS 40 is necessary (step S48).

As a result, when it is determined that the change of the CPU/memory of the SDS 40 is not necessary (step S48: No), the storage optimization program 316 determines the determination result as a pattern for updating the SDS node 50, specifically, (a pattern 2-1 (node addition pattern) or 2-2 (node deletion pattern)) (step S49), and ends the processing.

On the other hand, when it is determined that the change of the CPU/memory of the SDS 40 is necessary (step S48: Yes), the storage optimization program 316 determines the determination result as the pattern for updating the SDS node 50 (the pattern 2-1 or 2-2) and the pattern for updating the instance type of the SDS node 50 (the pattern 4-1) (step S50), and ends the processing.

In step S51, the storage optimization program 316 determines whether the change of the CPU/memory of the SDS 40 is necessary (step S51).

As a result, when it is determined that the change of the CPU/memory of the SDS 40 is not necessary (step S51: No), the storage optimization program 316 determines the determination result as a pattern for updating a duplicate VOL (volume update pattern: pattern 3-1 or 3-2) (step S52), and ends the processing.

On the other hand, when it is determined that the change of the CPU/memory of the SDS 40 is necessary (step S51: Yes), the storage optimization program 316 determines the determination result as the pattern for updating the duplicate VOL (the pattern 3-1 or 3-2) and the pattern for updating the instance type of the SDS node 50 (the pattern 4-1) (step S53), and ends the processing.

According to the optimization pattern determination processing, the change pattern of the storage corresponding to the input content can be appropriately determined by the user. For example, when the performance required for the storage system 2 is required to be high for a short period of time in the project, a pattern for adding a new SDS 40 is obtained, and it is not necessary to perform data relocation and the SDS 40 can be quickly used. In addition, when the project ends, the entire SDS 40 can be deleted without data relocation, and the SDS 40 can be quickly deleted.

Next, the processing executed in the configuration change processing (step S32) will be described.

Figure 14:
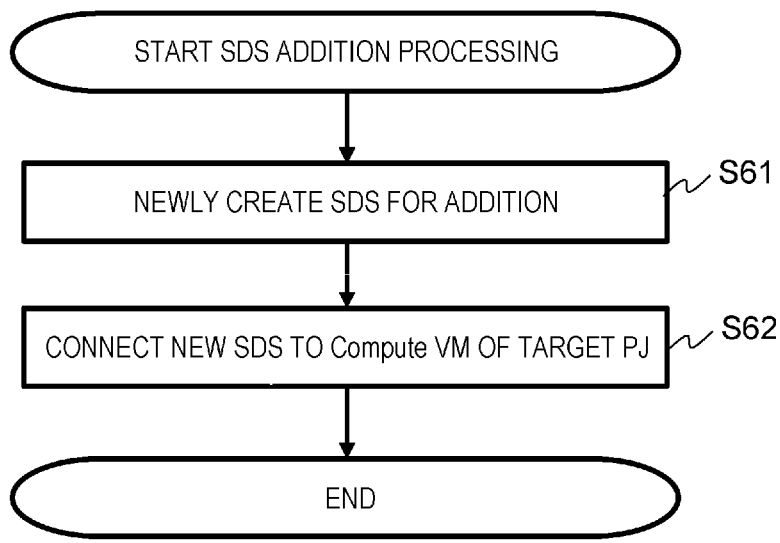
FIG. 14 is a flowchart of SDS addition processing according to the embodiment.

FIG. 14 is a flowchart of SDS addition processing according to the embodiment.

The SDS addition processing is executed in the configuration change processing (step S32) when the pattern of the optimization pattern 311c corresponding to the entry is the pattern 1-1 (storage addition pattern).

The storage optimization program 316 instructs the cloud 10 to newly create a new SDS 40 to create the SDS 40 (step S61).

Next, the storage optimization program 316 connects the created new SDS 40 to the compute VM 20 that executes a project to be processed (target PJ) corresponding to the input content and enables the new SDS 40 to be used (step S62), and ends the processing. Accordingly, a new SDS 40 is created in the cloud 10.

Figure 15:
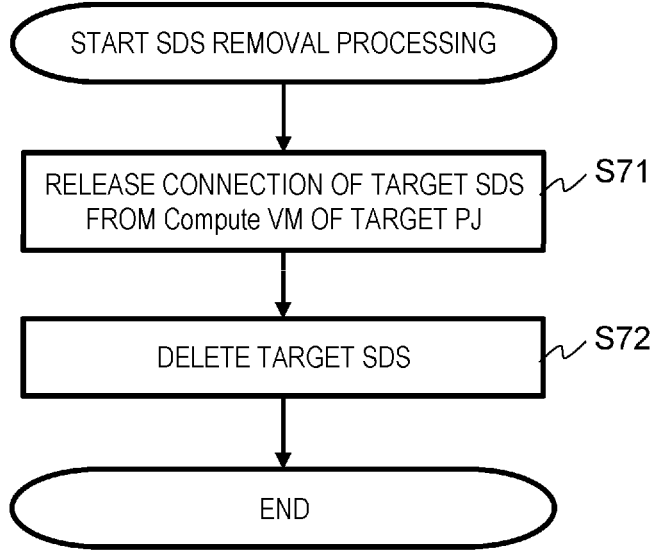
FIG. 15 is a flowchart of SDS removal processing according to the embodiment.

FIG. 15 is a flowchart of SDS removal processing according to the embodiment.

The SDS removal processing is executed in the configuration change processing (step S32) when the pattern of the optimization pattern 311c corresponding to the entry is the pattern 1-2 (storage removal pattern).

The storage optimization program 316 releases the connection of the SDS 40 to be removed to the compute VM 20 that executes a project to be processed (target PJ) corresponding to the input content (step S71).

Next, the storage optimization program 316 instructs the cloud 10 (specifically, a management device that manages the VM of the cloud 10) to delete an SDS 40 to be deleted, thereby deleting the SDS 40 to be deleted (step S72).

Figure 16:
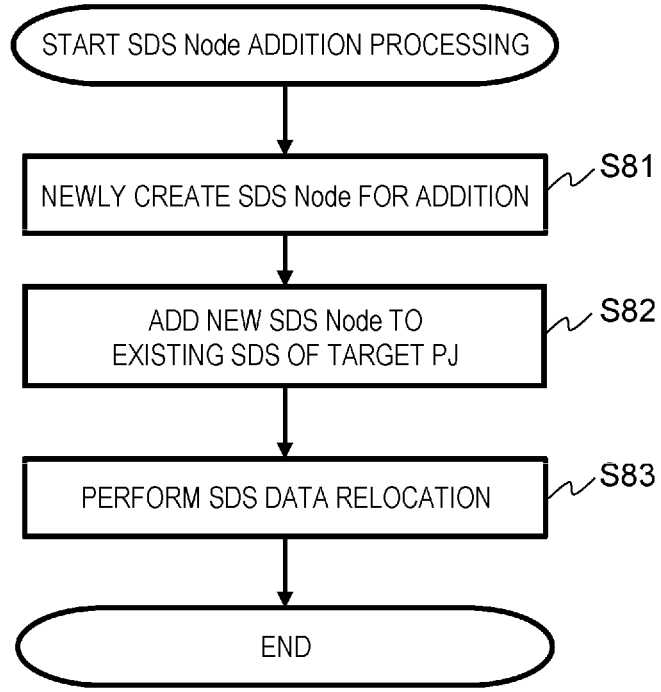
FIG. 16 is a flowchart of SDS node addition processing according to the embodiment.

FIG. 16 is a flowchart of SDS node addition processing according to the embodiment.

The SDS node addition processing is executed in the configuration change processing (step S32) when the pattern of the optimization pattern 311c corresponding to the entry is the pattern 2-1 (node addition pattern).

The storage optimization program 316 instructs the cloud 10 to create a new SDS node 50 (step S81). Accordingly, a new SDS node 50 is created in the cloud 10.

Next, the storage optimization program 316 instructs the SDS 40 used by the target project to add the created SDS node 50 (step S82).

Next, the storage optimization program 316 causes the SDS 40 to perform data relocation processing of relocating data in each SDS node 50 (step S83). Accordingly, the SDS 40 can be used in the project after the data relocation processing is completed.

Figure 17:
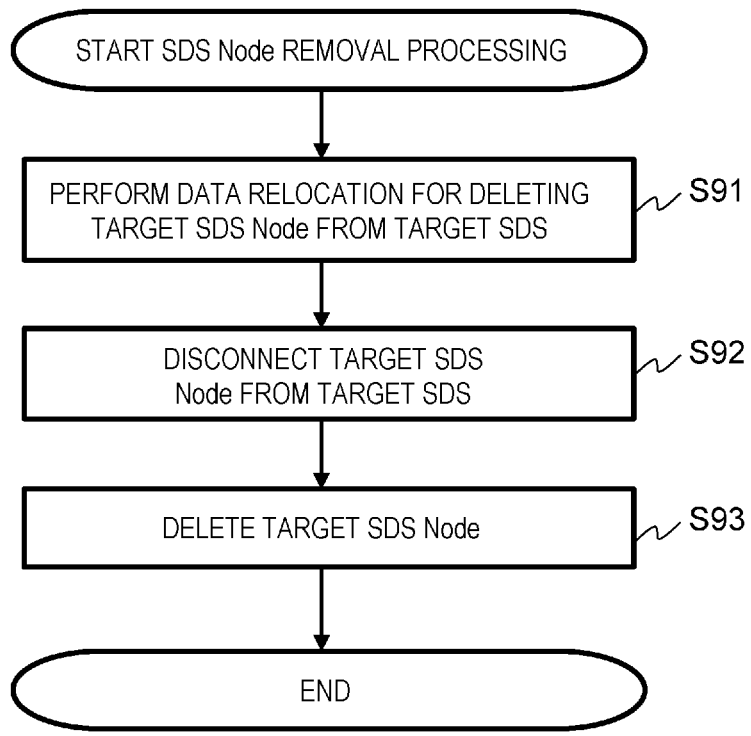
FIG. 17 is a flowchart of SDS node removal processing according to the embodiment.

FIG. 17 is a flowchart of SDS node removal processing according to the embodiment.

The SDS node removal processing is executed in the configuration change processing (step S32) when the pattern of the optimization pattern 311c corresponding to the entry is the pattern 2-2 (node removal pattern).

The storage optimization program 316 causes the SDS 40 to perform data relocation processing of relocating data to the SDS nodes 50 excluding the SDS node 50 to be removed (step S91).

Next, the storage optimization program 316 instructs to disconnect the SDS node to be removed from the SDS 40 used by the target project (step S92).

Next, the storage optimization program 316 instructs the cloud 10 to delete the SDS node 50 to be removed (step S93). Accordingly, the SDS node 50 to be removed is deleted in the cloud 10.

Figure 18:
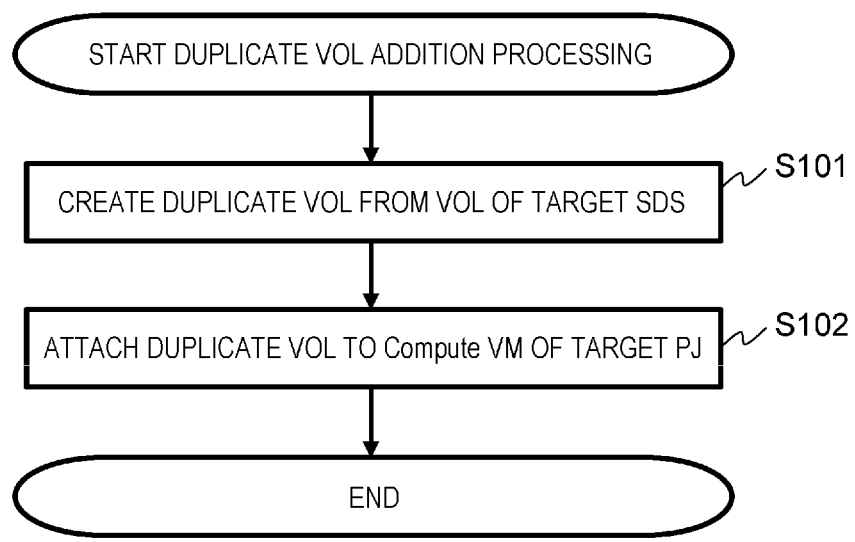
FIG. 18 is a flowchart of duplicate VOL addition processing according to the embodiment.

FIG. 18 is a flowchart of duplicate VOL addition processing according to the embodiment.

The duplicate VOL addition processing is executed in the configuration change processing (step S32) when the pattern of the optimization pattern 311c corresponding to the entry is the pattern 3-1 (volume addition pattern).

The storage optimization program 316 creates a volume obtained by duplicating a volume to be duplicated (duplicate volume) in the SDS 40 (step S101).

Next, the storage optimization program 316 attaches the duplicate volume to the compute VM 20 used by the target project such that the duplicate volume can be used (step S102). Accordingly, it is possible to increase the volume in which the same data that can be used by the compute VM 20 is stored.

Figure 19:
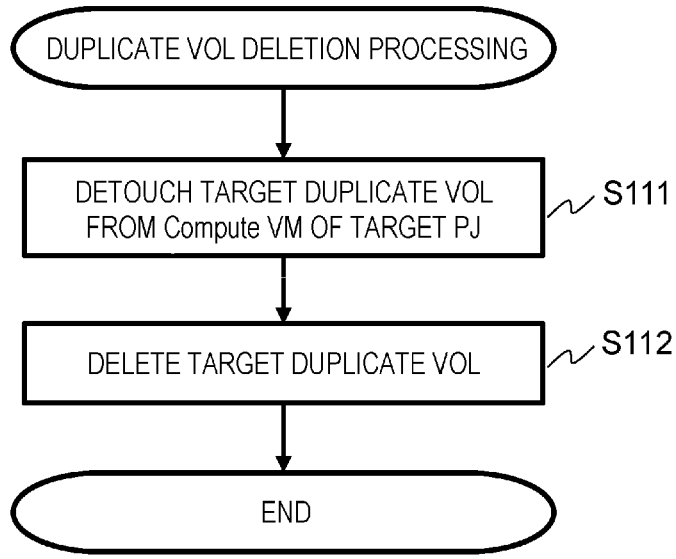
FIG. 19 is a flowchart of duplicate VOL deletion processing according to the embodiment.

FIG. 19 is a flowchart of duplicate VOL deletion processing according to the embodiment.

The duplicate VOL deletion processing is executed in the configuration change processing (step S32) when the pattern of the optimization pattern 311c corresponding to the entry is the pattern 3-2 (volume removal pattern).

The storage optimization program 316 detaches the volume to be removed from the compute VM 20 used by the target project (step S111).

Next, the storage optimization program 316 deletes the volume to be removed in the SDS 40 (step S112).

Figure 20:
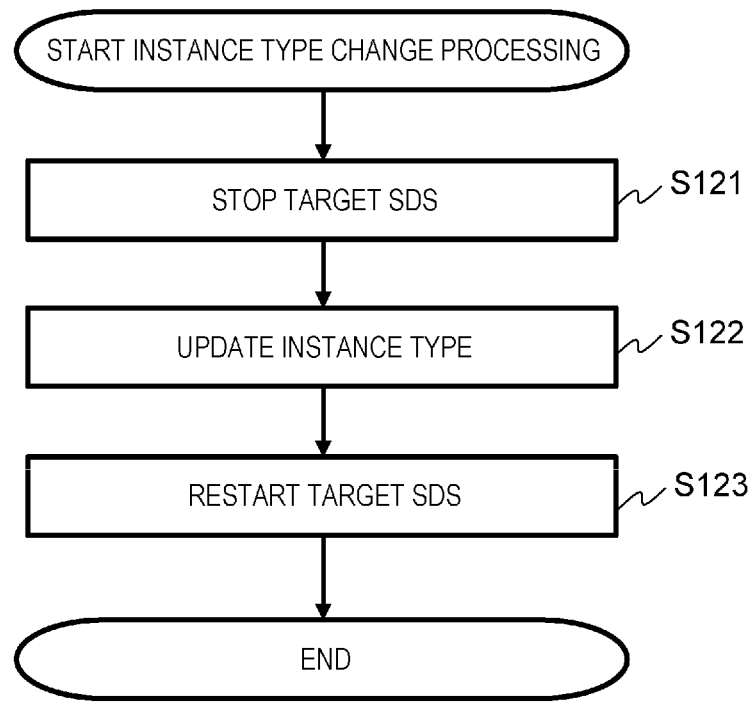
FIG. 20 is a flowchart of instance type change processing according to the embodiment.

FIG. 20 is a flowchart of instance type change processing according to the embodiment.

The instance type change processing is executed in the configuration change processing (step S32) when the pattern of the optimization pattern 311c corresponding to the entry is the pattern 4-1 (instance change pattern).

The storage optimization program 316 stops a target SDS 40 for changing an instance type of the SDS node 50 (step S121).

Next, the storage optimization program 316 changes the instance type of the SDS node 50 of the target SDS 40 (step S122).

The SDS 40 in which the instance type of the SDS node 50 is updated is restarted (step S123). Accordingly, the SDS node 50 of the SDS 40 operates in the configuration of the changed instance type.

The invention is not limited to the above embodiment, and may be appropriately modified and implemented without departing from the gist of the invention.

For example, in the above embodiment, the performance neck is analyzed, and the configuration of the instance is changed so as to increase the resource amount of the resource serving as the performance neck. For example, by receiving designation of the instance that increases the resource amount from the user and determining that the configuration of the resource needs to be changed based on the designation, the configuration of the instance may be changed so as to increase the resource amount.

In the above embodiment, a part or all of the processing performed by the CPU may be performed in a hardware circuit. In addition, the program in the above embodiment may be installed from a program source. The program source may be a program distribution server or a storage medium (for example, a portable storage medium).

What is claimed is:

1. A system configuration management device for managing a storage system including one or more storages implemented by a plurality of storage nodes, the system configuration management device comprising:
   a processor,
   wherein the processor is configured to:
      receive a request for an execution period and a necessary performance of a project using the storage system, and
      select, based on consumption information and performance information of a resource of the storage, one or more change patterns satisfying the request for the execution period and the necessary performance from among a plurality of change patterns indicating configuration changes of the storage system.

2. The system configuration management device according to claim 1,
   wherein the processor is configured to execute processing of changing a configuration of the storage system according to the selected change pattern.

3. The system configuration management device according to claim 2,
   wherein the processor is configured to determine an execution time of the selected change pattern, and execute the processing of changing the configuration of the storage system when the execution time comes.

4. The system configuration management device according to claim 1,
   wherein the plurality of change patterns include a storage addition pattern of newly adding a storage implemented by a plurality of storage nodes and a node addition pattern of newly adding a storage node to the storage, and
   wherein the processor is configured to select the storage addition pattern when the execution period of the project using the storage system is shorter than a predetermined period, and select the node addition pattern when the execution period is longer than the predetermined period or when an end of the execution period is not determined.

5. The system configuration management device according to claim 4,
   wherein the processor is configured to further select a storage removal pattern of removing the added storage when the execution period of the project using the storage system is shorter than the predetermined period.

6. The system configuration management device according to claim 5,
   wherein the processor is configured to determine an execution time of the storage removal pattern to be after an end of the execution period of the project, and execute processing of changing a configuration of the storage system according to the storage removal pattern when the execution time comes.

7. The system configuration management device according to claim 1,
   wherein the storage node is implemented by a virtual computer,
   wherein the change pattern includes an instance change pattern of changing a resource amount of an instance of the virtual computer, and
   wherein the processor is configured to select the instance change pattern when it is necessary to change a resource amount of the instance in order to satisfy the request for the necessary performance.

8. The system configuration management device according to claim 1,
   wherein the change pattern includes a volume update pattern of updating a volume to be used by the project, and
   wherein the processor is configured to select the volume update pattern when it is necessary to change a number of duplicate volumes obtained by duplicate the volume in order to satisfy a request for a performance of the storage system.

9. A system configuration management method performed by a system configuration management device for managing a storage system including one or more storages implemented by a plurality of storage nodes, the method comprising:
   receiving a request for an execution period and a necessary performance of a project using the storage system; and
   determining, based on consumption information and performance information of a resource of the storage, one or more change patterns satisfying the request for the execution period and the necessary performance from among a plurality of change patterns indicating configuration changes of the storage system.

10. A non-transitory computer readable medium storing a system configuration management program to be executed by a computer that manages a storage system including one or more storages implemented by a plurality of storage nodes, wherein
    the system configuration management program is configured to cause the computer to:
       receive a request for an execution period and a necessary performance of a project using the storage system, and
       determine, based on consumption information and performance information of a resource of the storage, one or more change patterns satisfying the request for the execution period and the necessary performance from among a plurality of change patterns indicating configuration changes of the storage system.

\* \* \* \* \*